(12) United States Patent
Gao

(10) Patent No.: US 8,016,509 B2
(45) Date of Patent: Sep. 13, 2011

(54) ROBOTIC JOINT

(76) Inventor: Zhong Gao, Quincy, MA (US)

(*) Notice: Subject to any disclaimer, the term of this patent is extended or adjusted under 35 U.S.C. 154(b) by 660 days.

(21) Appl. No.: 12/115,369

(22) Filed: May 5, 2008

(65) Prior Publication Data

US 2008/0272728 A1 Nov. 6, 2008

Related U.S. Application Data

(60) Provisional application No. 60/916,197, filed on May 4, 2007.

(51) Int. Cl.
*B25J 17/02* (2006.01)
(52) U.S. Cl. .................. 403/57; 464/56; 901/29
(58) Field of Classification Search .............. 464/55, 464/56, 136; 403/53, 57, 60; 901/28, 29; 74/490.03–490.06
See application file for complete search history.

(56) References Cited

U.S. PATENT DOCUMENTS

| 3,922,930 | A  | * | 12/1975 | Fletcher et al. | ................. 901/28 |
| 6,969,385 | B2 | * | 11/2005 | Moreyra | .......................... 901/29 |
| 7,331,750 | B2 | * | 2/2008 | Merz et al. | ............. 74/490.05 X |

FOREIGN PATENT DOCUMENTS

| NL | 8900331 | * | 9/1990 | ...................... 901/28 |
| SU | 471189 | * | 8/1975 | ...................... 901/28 |
| SU | 1458212 | * | 2/1989 | ...................... 901/29 |

* cited by examiner

*Primary Examiner* — Greg Binda
(74) *Attorney, Agent, or Firm* — Burns & Levinson LLP; Jerry Cohen; David Gomes

(57) ABSTRACT

A driven joint for coupling two structural members is angularly adjustable in two polar or orthogonal dimensions and provides a pair of nonparallel, crossed axles, each having a middle section located between a pair of opposed side sections, wherein the pair of axles are mounted to each other along their respective middle sections and each axle of the pair of axles is rotationally mounted at its respective side sections to a respective structural member, a separate arcuate drive member orthogonally affixed to each respective axle and adapted to enable rotation of its respective axle and a separate drive mechanism mounted to each structural member and adapted to engage and rotate the respective arcuate drive member and the respective axle rotationally mounted to said each structural member.

12 Claims, 6 Drawing Sheets

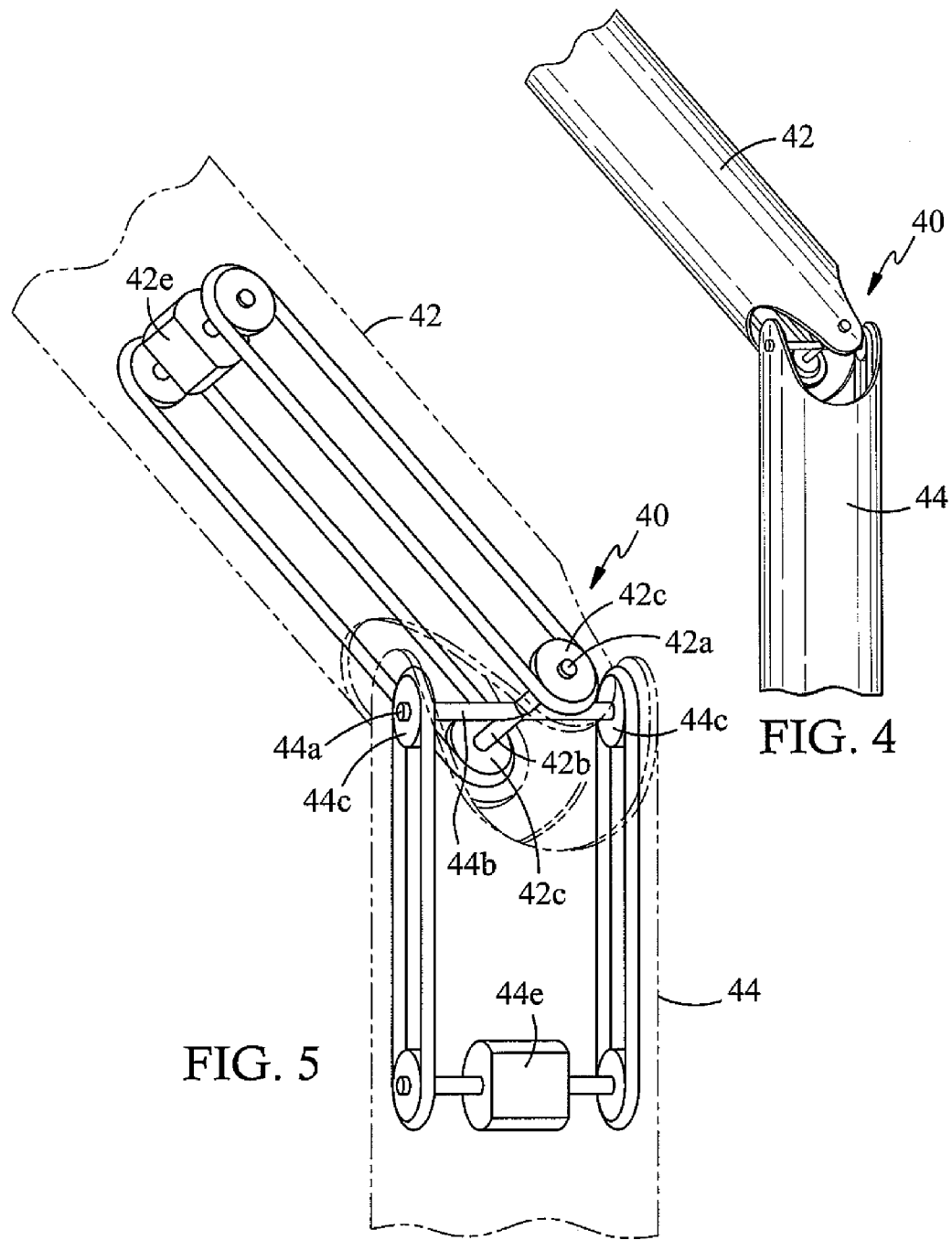

ROBOTIC JOINT

CROSS REFERENCE TO RELATED APPLICATIONS

This application claims the priority of U.S. Provisional Application Ser. No. 60/916,197, filed May 4, 2007 and incorporated herein by reference in its entirety.

FIELD OF THE INVENTION

The present invention relates to motorized robotic joints which connect structural members. More particularly, it relates to a joint adapted for independent control in two orthogonal dimensions.

BACKGROUND OF THE INVENTION

In FIGS. 1 and 2, a prior art mechanical joint 10 involves a rotating base 12 and an arm 14 that is hinged to components 16 and 18, which are attached to base 12. Three dimensional movement is enabled by using two independent motions. One motion causes the base 12 to rotate, while of the other motion adjusts the elevation of arm 14. Joint 10 has several limitations in motion. For example, in FIG. 2, arm 14 is positioned in an orientation that is perpendicular to base 12. When joint 10 is in this position, arm 14 is limited to directions 20 and 22. To lay arm 14 along a different direction, for example 24 and 26, joint 10 needs to rotate base 12 first, in order to prepare to lower arm 14. The alternative method is to rotate base 12 and lower arm 14 simultaneously, using a curved path. If particular tasks require path 28 or similar paths, it is extremely cumbersome to employ joint 10. Also, the construction of joint 10 does not support the spinning movement of arm 14 in most positions except for that shown in FIG. 2.

FIG. 3 shows a universal joint 30 constructed in accordance with the prior art. Universal joint 30 includes two shafts 32, 34 connected by a pair of orthogonally oriented hinges 36, 38, respectively. Hinges 36, 38 are attached to each other at their axles 36a, 38a.

SUMMARY OF THE INVENTION

In one embodiment a driven joint for coupling two structural members is angularly adjustable in two polar or orthogonal dimensions and comprises a pair of nonparallel, crossed axles, each having a middle section located between a pair of opposed side sections, wherein the pair of axles are mounted to each other along their respective middle sections and each axle of the pair of axles is rotationally mounted at its respective side sections to a respective structural member, a separate arcuate drive member orthogonally affixed to each respective axle and adapted to enable rotation of its respective axle and a separate drive mechanism mounted to each structural member and adapted to engage and rotate the respective arcuate drive member and the respective axle rotationally mounted to said each structural member.

The joint may further comprise a separate second arcuate drive member affixed to each axle on a respective side section thereof and adapted to enable rotation of its respective axle. The pair of axles may be orthogonally aligned with respect to each other. One axle of the pair of axles may be fixedly mounted to another axle of the pair of axles. One axle of the pair of axles may be rotationally mounted to another axle of the pair of axles. Each of the pair of axles may have a respective axis of rotation which intersect each other.

The arcuate drive member may be a wheel. One structural member may be a supportive member and another structural member may be a supported member, further wherein the separate drive mechanism mounted to the supported structural member may be located in proximity to the joint.

In another embodiment, a driven joint coupling two structural members and being angularly adjustable in two polar or orthogonal dimensions, comprises a pair of nonparallel, crossed axles, each having a middle section located between a pair of opposed side sections, wherein a first axle of the pair of axles is rotationally mounted to a second axle of the pair of axles within their respective middle sections, further wherein each axle is rotationally mounted at its side sections to a respective structural member, a separate arcuate drive member orthogonally affixed to each respective axle concentric with an axis of rotation of each respective axle and a separate drive mechanism adapted to engage and rotate each arcuate drive member and its respective axle.

The respective arcuate drive member may be affixed to the first axle within its respective middle section. The pair of axles may be orthogonally aligned with respect to each other. The pair of axles may each have a respective axis of rotation which intersect each other. The separate drive mechanisms may both be mounted in a single structural member.

One separate arcuate drive member is affixed to the second axle on one of the respective pair of opposed side sections. The joint may further comprise a separate second arcuate drive member orthogonally affixed to the second axle on a respective other side section thereof and concentric with a respective axis of rotation thereof.

The two structural members may include a supported structural member having the first axle rotationally mounted thereto and a supportive structural member having the second axle rotationally mounted thereto. The separate drive mechanisms may both be mounted in the supportive structural member.

The second axle may include an opening along an axis of rotation of the second axle, and further wherein the arcuate drive member affixed to the first axle may be located at least partially within the opening of the second axle. The arcuate drive member orthogonally affixed to the first axle may be a wheel adapted to partially receive a flexible tension drive member. The second axle may include two pairs of bearing members adapted to maintain engagement between the wheel of the arcuate drive member of the first axle and the flexible tension drive member during partial rotation of the second axle around its axis of rotation.

In yet another embodiment a universal joint for controlling an angle between two drive shaft members comprises a pair of nonparallel, crossed axles, each having a middle section located between a pair of opposed side sections, wherein the pair of axles are mounted to each other along their respective middle sections and each axle of the pair of axles is rotationally mounted at its respective side sections to a respective drive shaft member, a separate arcuate drive member orthogonally affixed to each respective axle and adapted to enable rotation of its respective axle and a separate drive mechanism mounted to each drive shaft member and adapted to engage and rotate the respective arcuate drive member and the respective axle rotationally mounted to said each structural member to control the angle between the two drive shaft members.

BRIEF DESCRIPTION OF THE DRAWINGS

The present disclosure is described herein in reference to the appended drawings in which:

FIG. 4 is a perspective view of a robotic joint constructed in accordance with one embodiment of the present invention;

FIG. 5 is an exposed perspective view of the robotic joint of FIG. 4;

DETAILED DESCRIPTION OF THE INVENTION

Figure 1:
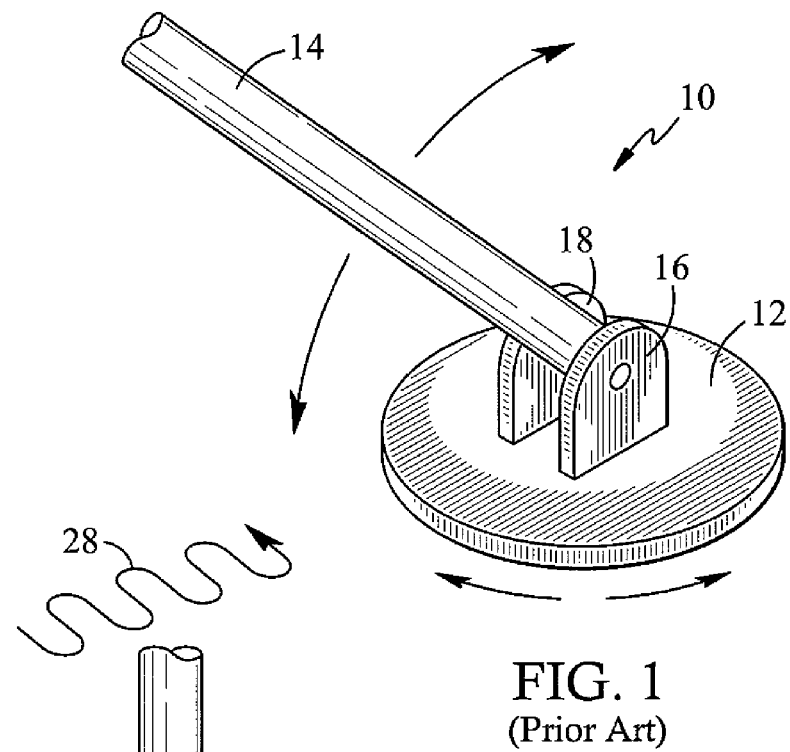
FIG. 1 is a perspective view of a joint constructed in accordance with the prior art.
Figure 2:
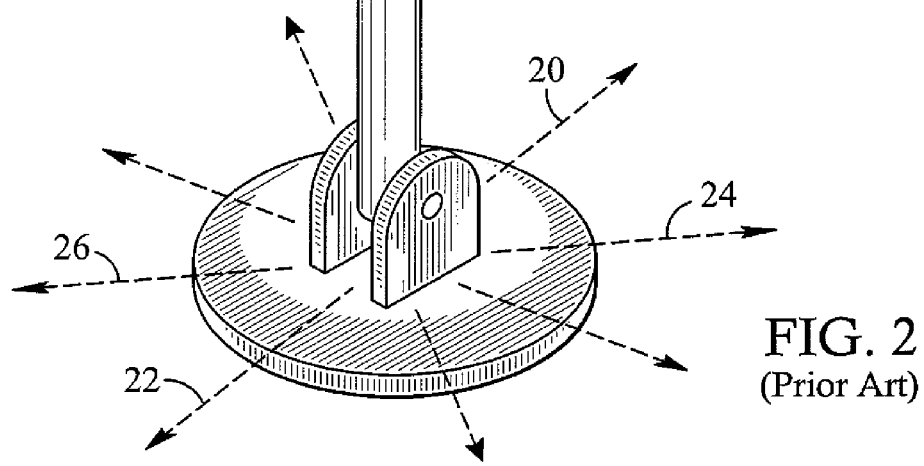
FIG. 2 is a perspective view of the prior art joint of FIG. 2.
Figure 3:
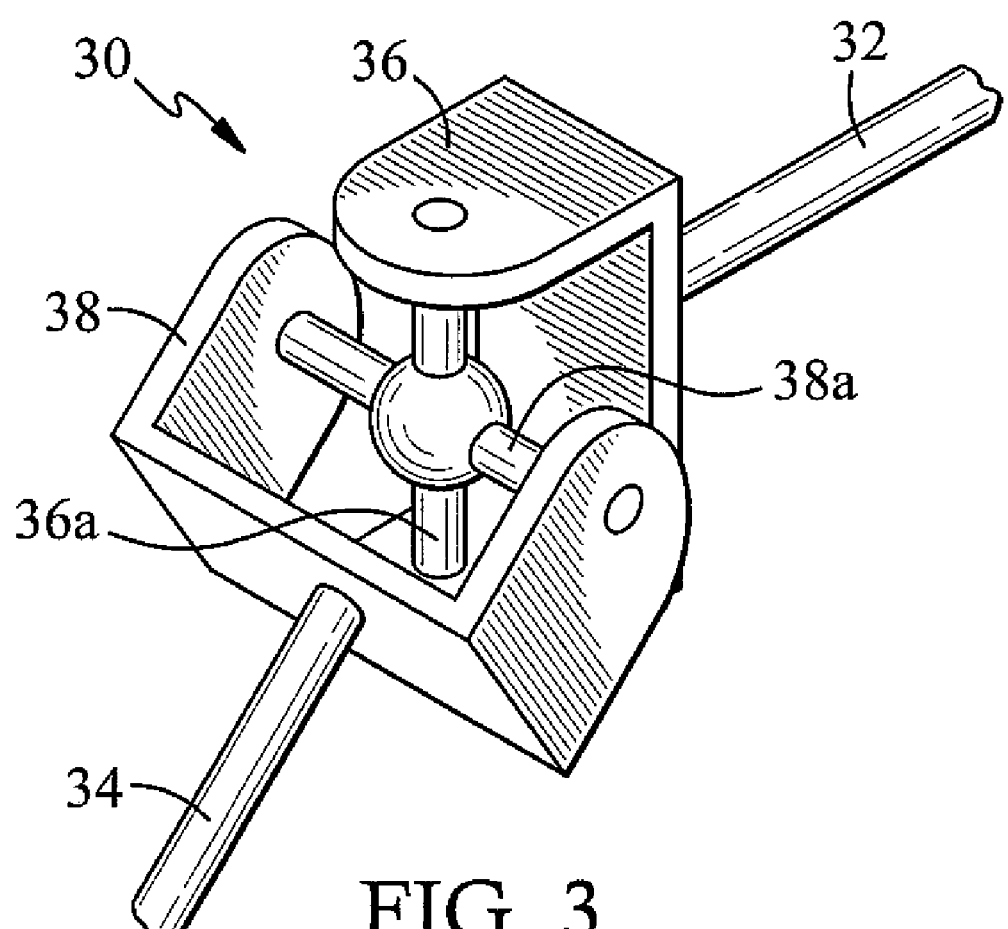
FIG. 3 is a perspective view of a universal joint constructed in accordance with the prior art.

FIG. 4 shows a robotic joint 40 constructed in accordance with one embodiment of the present invention as it might appear from an exterior view. FIG. 5 shows the robotic joint 40 exposing internal components used for controlling the robotic joint. Robotic joint 40 generally connects a pair of structural members 42, 44, which each include a respective hinge 42a, 44a to collectively form joint 40. Each hinge 42a, 44a includes a respective axle 42b, 44b mounted for rotation at the end of its respective structural member 42, 44. Axles 42b, 44b are connected together at their coincident middle sections 46. Axles 42b, 44b may be attached to each other with their axes of rotation intersecting or with them being offset.

Figure 6:
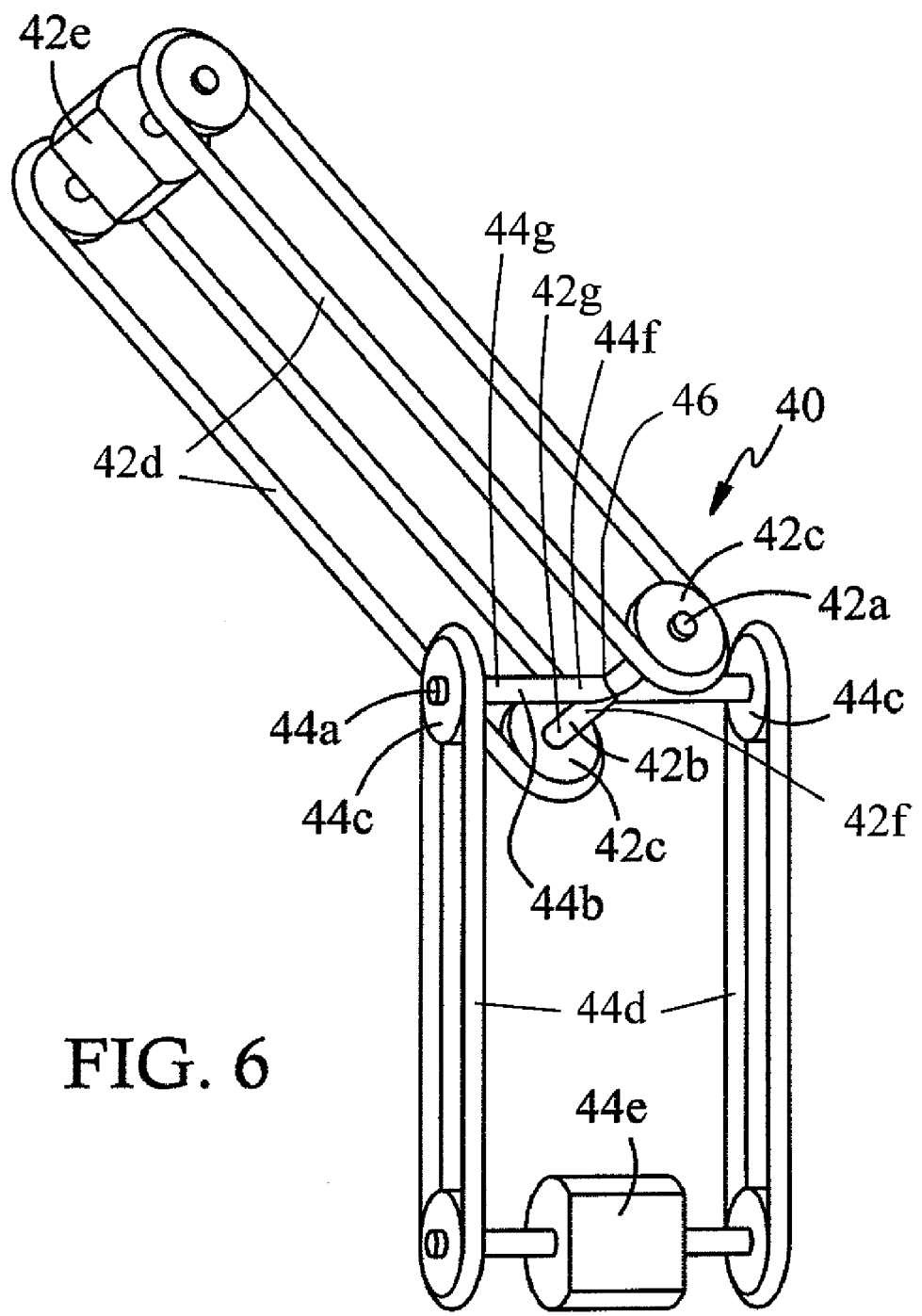
FIG. 6 is a perspective view of the internal mechanism of the joint of FIGS. 4 and 5.

FIG. 6 shows just the interconnected hinge axles 42b, 44b of joint 44 for further clarity. Axles 42b, 44b each include a central or middle section 42f, 44f where they are interconnected. Axles 42b, 44b are shown fixedly mounted to each other but they may be rotationally mounted as described below in an alternate embodiment. Likewise, axles 42b, 44b may be attached at right angles to each other, or at a different angle depending upon the needs of an application.

Each axle 42b, 44b has a pair of respective arcuate drive members or wheels 42c, 44c affixed to respective side sections 42g, 44g (FIG. 6) of axles 42b, 44b. This attachment allows the rotation of axles 42b, 44b to be controlled through wheels 42c, 44c by drive belts 42d, 44d, respectively. Drive belts 42d, 44d are respectively driven by motors 42e, 44e mounted inside respective structural members 42, 44.

In operation the angular position of each structural member 42, 44 with respect to the other structural member 44, 42 may be controlled in the dimension defined by the hinge axle 42b, 44b or each respective structural member. Thus, the angle of structural member 42 with respect to structural member 44 is controlled with respect to the angle around axle 44b by motor 44e. Likewise the angle of structural member 42 with respect to structural member 44 is controlled with respect to the angle around axle 42b by motor 42e.

Joint 40 may be optimized with consideration of which structural member is supportive and which is supported with respect to joint 40. For example, member 42 may be supported by the end thereof that is not shown, and thus member 42 would be supportive of joint 40. This would cause member 44 to be supported by joint 40. With this arrangement, the moment created by relatively heavy motors 42e, 44e may be optimized by locating motor 44e closer to joint 40 and locating motor 42e further away from joint 40 to thereby reduce the moment load on joint 40 and the structural element created by members 42, 44.

Wheels 42c, 44c, drive belts 42d, 44d and motors 42e, 44e are a nominal example of a drive mechanism for joint 40. Any suitable drive mechanism may be used. It is readily appreciated that the relative angular movement around the hinges 42a, 44a may be limited to approximately 180 degrees or even less, and therefore the full circumference of wheels 42c, 44c are not being used for drive purposes. Thus, wheels 42c, 44c may be replaced with partial arcuate sectors there and still provide the same degree of rotation for each hinge 42a, 44a. Further, if the amount of rotation around each hinge 42a, 44a is further limited, a further limited drive mechanism may be suitable. Wheels, 42c, 44c may also be replaced by driven gears, where suitable. In this manner, the arcuate drive member needs to be little more than a pair of spokes that are affixed to the drive belts and that describe an arcuate path as their respective axle rotates.

Figure 7:
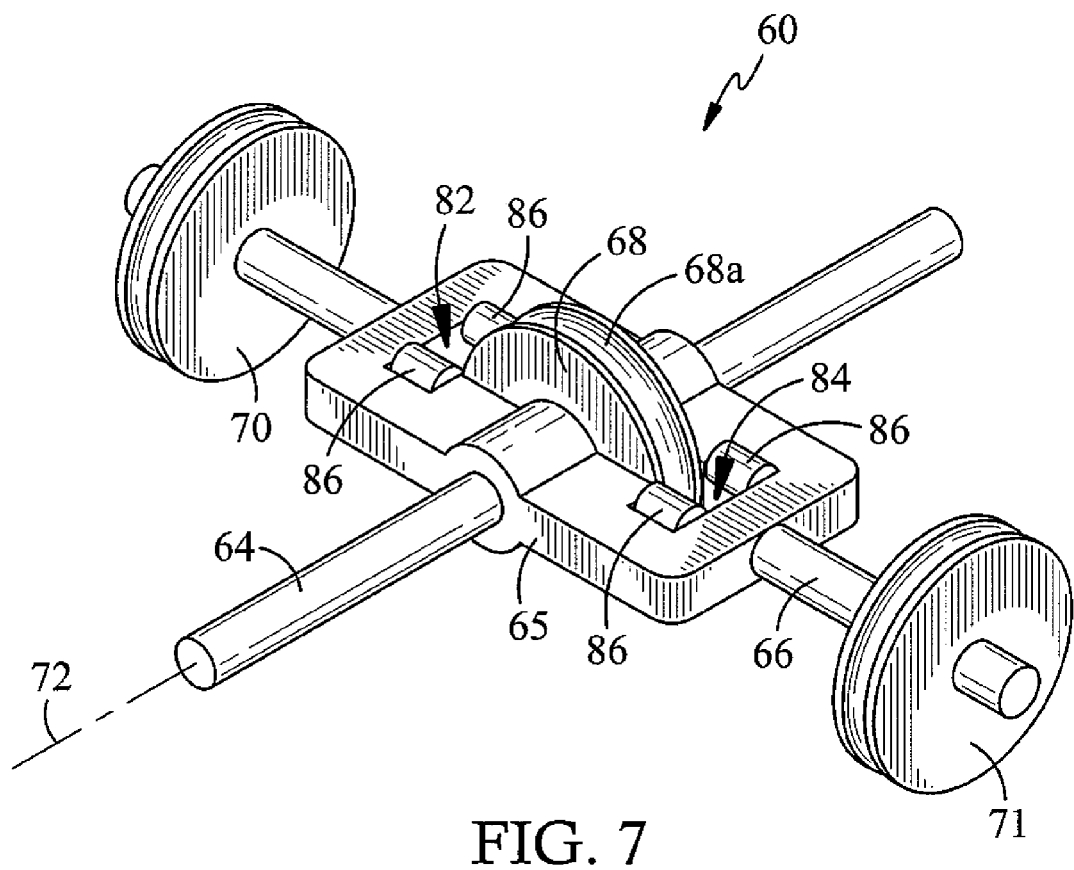
FIG. 7 is a perspective view of part of a robotic joint mechanism constructed in accordance with another embodiment of the present invention.

FIG. 7 shows a joint mechanism 60 constructed in accordance with another embodiment of the present invention. Mechanism 60 is shown installed in a driven joint 62 in FIG. 8. Joint mechanism 60 generally includes a pair of axles 64, 66, wherein axle 64 is rotatably mounted through a middle portion 65 of axle 66 as opposed to being rigidly mounted thereto, as described in reference to the previous figures. Axle 64 includes a drive wheel 68 rigidly affixed thereto, while axle 66 includes a pair of drive wheels 70, 71 rigidly affixed thereto. Thus, the rigidly affixed axle 64 and drive wheel 68 are mounted to freely rotate, with respect to axle 66, around its axis of rotation 72.

Figure 8:
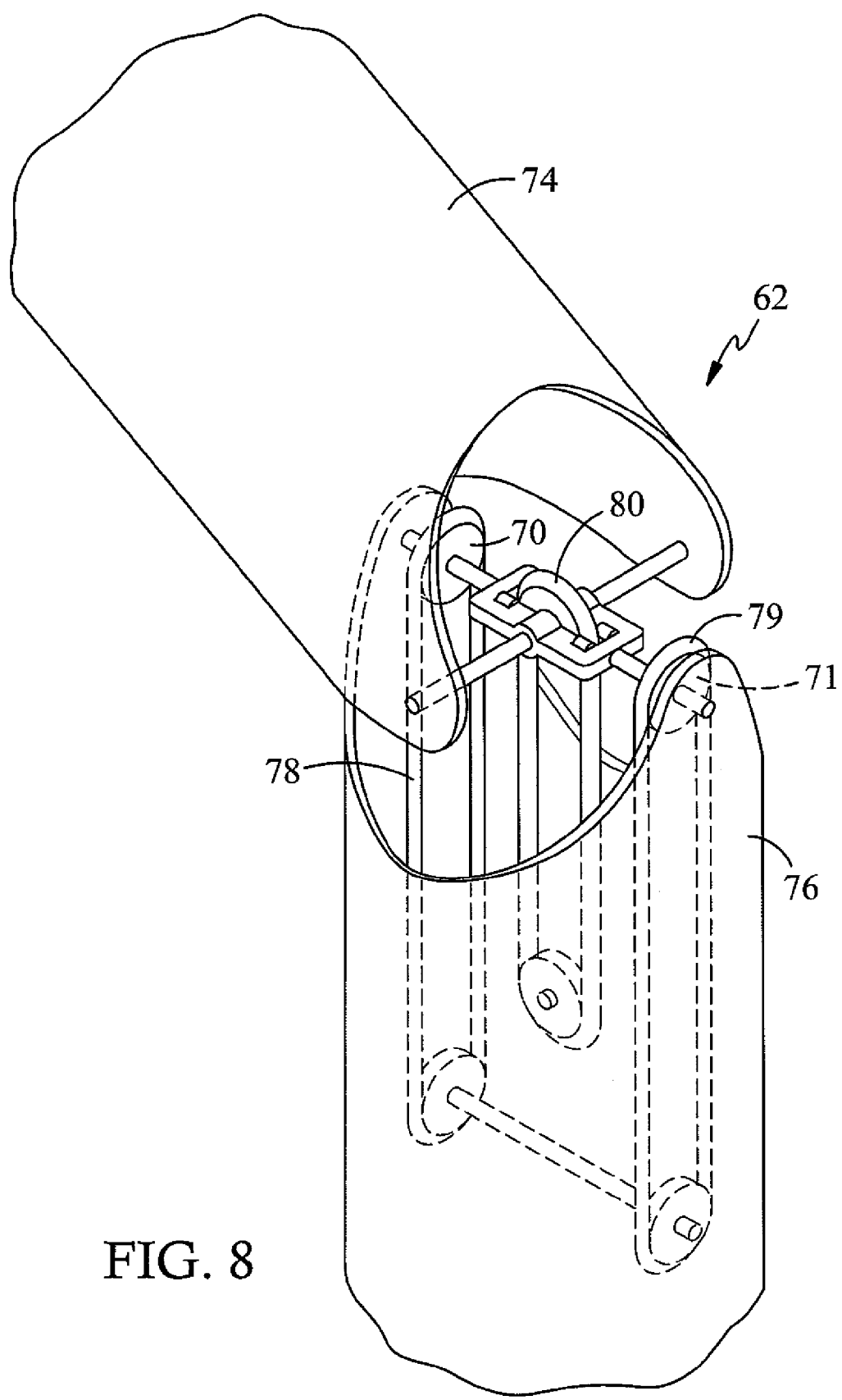
FIG. 8 is a perspective view of the mechanism of FIG. 7 located within a robotic joint.

FIG. 8 shows the mechanism 60 of FIG. 7 located within joint 62 between a pair of structural members 74, 76. Drive wheels 70, 71 are shown to be driven by drive belts 78, 79, respectively. Drive belt 80 is shown to extend through openings 82, 84 in the central section of axle 66 in FIG. 7. Drive belts 78-80 are intended to be driven by any suitable motors (not shown) in same manner as motors 42e, 44e in FIG. 5. The embodiment of FIGS. 7, 8 allows drive wheels 68, 70, 71 to be driven from a single structural member 76 in FIG. 8. This is enabled by allowing the lateral bending of drive belt 80 in addition to its normal radial bending. Thus, when drive wheels 70, 71 rotate axle 66 and the angle between structural members 74, 76 is less than 180 because of this rotation, drive belt 80 is forced to bend laterally at openings 82, 84 in axle 66. This bending is facilitated by the use of a drive belt 80 having a circular cross section and also by a pair of rollers 86 located on opposite sides of each of openings 82, 84. Rollers 86 maintain drive belt 80 within recess 68a (FIG. 7) of drive wheel 68.

The various robotic joints of the present disclosure are adapted to support a spinning motion of the respective robotic arms by coordinating control of drive motors connected to each of the drive wheels while maintaining full positional control of the respective arms. In this sense, the present invention may be claimed as a universal joint adapted to control the angle between members across the joint.

The present invention can be applied in many fields, especially those relating to robotics. The present disclosure features improve performance in certain orientations of the mechanical parts. Meanwhile, the locations of motors to power the joint is not limited in the joint, but can be adjusted to any part of each mechanical member being joined.

Although the invention has been described with respect to various embodiments, it should be realized this invention is also capable of a wide variety of further and other embodiments.

What is claimed is:

1. A driven joint coupling two structural members and being angularly adjustable in two polar or orthogonal dimensions, comprising:
- a pair of nonparallel, crossed axles, each having a middle section located between a pair of opposed side sections;
- wherein a first axle of the pair of axles is rotationally mounted to a second axle of the pair of axles within their respective middle sections;
- further wherein each axle is rotationally mounted at its side sections to a respective structural member;
- a separate arcuate drive member orthogonally affixed to each respective axle concentric with an axis of rotation of each respective axle; and
- a separate drive mechanism adapted to engage and rotate each arcuate drive member and its respective axle.

2. The joint of claim 1, wherein the respective arcuate drive member is affixed to the first axle within its respective middle section.

3. The joint of claim 1, wherein one said separate arcuate drive member is affixed to the second axle on one of the respective pair of opposed side sections.

4. The joint of claim 3, further comprising a separate second arcuate drive member orthogonally affixed to the second axle on a respective other side section thereof and concentric with a respective axis of rotation thereof.

5. The joint of claim 1, wherein the pair of axles are orthogonally aligned with respect to each other.

6. The joint of claim 1, wherein the pair of axles each has a respective axis of rotation which intersect each other.

7. The joint of claim 1, wherein the separate drive mechanisms are both mounted in a single structural member.

8. The joint of claim 1, wherein the two structural members include a supported structural member having the first axle rotationally mounted thereto and a supportive structural member having the second axle rotationally mounted thereto.

9. The joint of claim 8 wherein the separate drive mechanisms are both mounted in the supportive structural member.

10. The joint of claim 1, wherein the second axle includes an opening along an axis of rotation of the second axle, and further wherein the arcuate drive member affixed to the first axle is located at least partially within the opening of the second axle.

11. The joint of claim 10, wherein the arcuate drive member orthogonally affixed to the first axle is a wheel adapted to partially receive a flexible tension drive member.

12. The joint of claim 11, wherein the second axle includes two pairs of bearing members adapted to maintain engagement between the wheel of the arcuate drive member of the first axle and the flexible tension drive member during partial rotation of the second axle around its axis of rotation.

* * * * *